United States Patent
Yagi

(10) Patent No.: US 9,565,728 B2
(45) Date of Patent: Feb. 7, 2017

(54) LED DRIVER DEVICE, AND TELEVISION RECEIVER

(71) Applicant: SHARP KABUSHIKI KAISHA, Osaka-shi, Osaka (JP)

(72) Inventor: Norikazu Yagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 40 days.

(21) Appl. No.: 14/408,879

(22) PCT Filed: Jun. 13, 2013

(86) PCT No.: PCT/JP2013/066365
§ 371 (c)(1),
(2) Date: Dec. 17, 2014

(87) PCT Pub. No.: WO2013/191083
PCT Pub. Date: Dec. 27, 2013

(65) Prior Publication Data
US 2015/0181660 A1    Jun. 25, 2015

(30) Foreign Application Priority Data

Jun. 18, 2012  (JP) ................................. 2012-137224

(51) Int. Cl.
| H04N 5/44 | (2011.01) |
| H04N 5/66 | (2006.01) |
| G09G 3/34 | (2006.01) |
| H05B 33/08 | (2006.01) |

(52) U.S. Cl.
CPC ............ *H05B 33/083* (2013.01); *G09G 3/342* (2013.01); *H04N 5/44* (2013.01); *H04N 5/66* (2013.01); *H05B 33/0815* (2013.01); *H05B 33/0824* (2013.01); *G09G 2320/064* (2013.01); *G09G 2330/00* (2013.01)

(58) Field of Classification Search
CPC ............ H05B 33/0815; H05B 33/0824; H05B 33/083; G09G 3/342; G09G 2330/00; G09G 2320/064; H04N 5/66; H04N 5/44
See application file for complete search history.

(56) References Cited

U.S. PATENT DOCUMENTS

| 2005/0213352 A1* | 9/2005 | Lys ....................... F21S 48/325 363/17 |
| 2006/0132061 A1* | 6/2006 | McCormick ........ H02M 1/4258 315/291 |
| 2012/0074856 A1* | 3/2012 | Takata ............... H05B 33/0815 315/192 |

(Continued)

FOREIGN PATENT DOCUMENTS

| JP | 2006-210435 A | 8/2006 |
| JP | 2010-15883 A | 1/2010 |

*Primary Examiner* — Brian Yenke
*Assistant Examiner* — Sean Haiem
(74) *Attorney, Agent, or Firm* — Birch, Stewart, Kolasch & Birch, LLP

(57) ABSTRACT

An LED drive circuit (1) includes: a booster circuit (2); a light emitting pattern generator (5); and a switching switch (3) for, (i) during an on period, feeding back, to the booster circuit (2), an electric current flowing to an LED (7), and (ii) during an off period, feeding back, to the booster circuit (2), a voltage signal obtained by dividing an output voltage of the booster circuit (2).

6 Claims, 10 Drawing Sheets

(56) References Cited

U.S. PATENT DOCUMENTS

| | | | | |
|---|---|---|---|---|
| 2012/0133291 A1* | 5/2012 | Kitagawa | ............ | H05B 33/0812 |
| | | | | 315/186 |
| 2012/0187858 A1* | 7/2012 | Omi | .................... | H05B 33/0815 |
| | | | | 315/224 |
| 2012/0326630 A1* | 12/2012 | Seo | .................... | H05B 33/0815 |
| | | | | 315/297 |

* cited by examiner

LED DRIVER DEVICE, AND TELEVISION RECEIVER

TECHNICAL FIELD

The present invention relates to an LED drive device which includes a booster circuit and drives a light emitting diode (hereinafter referred to as an "LED") in a switching mode in accordance with an on/off signal which specifies turning on/off of a switching element.

BACKGROUND ART

In a case where an LED is used for a backlight of, for example, a liquid crystal television, the following configuration has been known (see Patent Literature 1). According to the configuration, a voltage source for turning on the LED is supplied by a booster circuit to the LED, and a pulse width modulation duty ratio (PWM-Duty) in which an electric current flowing to the LED is turned on/off is adjusted so that a desired light emitting brightness of the LED can be obtained.

FIG. 9 is a circuit diagram illustrating a configuration of a conventional LED drive device 1000. The LED drive device 1000 includes LEDs 300R through 300B and a power supply device 100 for driving the LEDs 300R through 300B. The LED drive device 1000 is driven by a battery 200, and the power supply device 100 generates a drive voltage Vout for driving the LEDs 300R through 300B by boosting a battery voltage supplied from the battery 200. When colors do not particularly need to be distinguished from each other, the following description omits indices R, G, and B which are attached to members so as to correspond to the respective colors.

The power supply device 100 has an input terminal 102 via which a battery voltage is inputted, an output terminal 104 which is connected with an anode terminal of an LED 300 and via which an output voltage Vout obtained by boosting the battery voltage is outputted, and an LED terminal 106 which is connected with a cathode terminal of the LED 300.

The power supply device 100 includes a booster circuit 60 and a drive control section 70. The booster circuit 60 boosts the battery voltage inputted via the input terminal 102 and outputs the output voltage Vout via the output terminal 104.

The booster circuit 60 serves as a switching power supply including switching elements such as a switching regulator and a charge pump circuit. The booster circuit 60 has an enable terminal EN. When the enable terminal EN receives an enable signal SIG12 which is at a high level, the booster circuit 60 boosts the battery voltage by carrying out a switching operation. Meanwhile, when the enable terminal EN receives the enable signal SIG12 which is at a low level, the booster circuit 60 stops the switching operation.

The drive control section 70 controls a drive state of each of the LEDs 300R through 300B. The drive control section 70 includes constant current circuits 22R through 22B, switches 24R through 24B, AND gates 26R through 26B, a brightness controlling PWM oscillator 30, a light emitting pattern generator 82, and an OR gate 34.

The light emitting pattern generator 82 controls turning on/off of the LEDs 300R through 300B in accordance with data stored in a memory or externally supplied data. The light emitting pattern generator 82 generates light emission control signals SIG10R through SIG10B corresponding to the respective colors. When each emission control signal SIG10 is at a high level, a corresponding LED 300 emits light. Meanwhile, when the each light emission control signal SIG10 is at a low level, the corresponding LED 300 stops emitting light.

A constant-current circuit 22 is connected with a cathode of the LED 300 via the LED terminal 106 and is provided on a path through which an electric current of each of the LEDs 300R through 300B flows. A switch 24 turns on/off electric current generation by the constant current circuit 22.

The brightness controlling PWM oscillator 30 generates a PWM signal SIG14 for turning on/off the switch 24. The brightness controlling PWM oscillator 30 includes a voltage comparator 40, an oscillator 42, and a reference voltage source 44. The reference voltage source 44 generates a reference voltage Vref corresponding to each of the colors R, G, and B. The oscillator 42 generates a periodic voltage Vosc having a triangular waveform or a saw-tooth waveform.

An AND gate 26 receives a light emission control signal SIG10 supplied from the light emitting pattern generator 82 and receives the PWM signal SIG14 supplied from the brightness controlling PWM oscillator 30. The AND gate 26 outputs a logical product of these two received signals in a form of an output signal SIG16. The output signal SIG16 of the AND gate 26 is at a high level when both the light emission control signal SIG10 and the PWM signal SIG14 are at a high level.

The OR gate 34 receives the three light emission control signals SIG10R through SIG10B supplied from the light emitting pattern generator 82. The OR gate 34 supplies a logical sum of these three received signals to the enable terminal EN of the booster circuit 60.

According to the LED drive device 1000 having the configuration, the booster circuit 60 supplies the drive voltage Vout to each of the plurality of LEDs 300R through 300B in the power supply device 100. The drive control section 70 controls the drive state, i.e., a light emitting brightness of each of the LEDs 300R through 300B. The drive control section 70 carries out time sharing driving with respect to a plurality of load circuits. Further, the booster circuit 60, which has the enable terminal EN, stops switching operation during a non-light emitting period in which none of the LEDs 300R through 300B are driven by the drive control section 70.

The light emitting pattern generator 82 generates the light emission control signals SIG10R through SIG10B for instructing the respective LEDs 300 to emit light. The booster circuit 60 logically operates the light emission control signals SIG10R through SIG10B so as to stop the switching operation during the non-light emitting period in which none of the LEDs 300 emit light.

As described earlier, the LED drive device 1000 turns on/off the LEDs 300R through 300B by turning on/off the respective switches 24R through 24B, and is capable of reducing electric power consumption by stopping oscillation of the booster circuit 60 during turning off of the LEDs 300R through 300B.

FIG. 10 is a circuit diagram illustrating a configuration of another conventional LED drive device. The LED drive device includes a direct-current power supply 201, a voltage detecting device 202, a control circuit 203, an input switch circuit 204, an output switch circuit 205, a signal formation circuit 206, a booster circuit 207, and an electric current detection circuit 208.

The direct-current power supply 201 generates a substantially constant direct-current voltage as an output voltage and supplies an electric current in accordance with a load connected with the direct-current power supply 201. When the direct-current power supply 201 has an output voltage Vin which is lower than a given threshold, the voltage detecting device 202 outputs a control signal for intercepting electric power supply from the direct-current power supply 201 to the booster circuit 207. The control circuit 203 outputs a control signal for controlling each of the input switch circuit 204 and the output switch circuit 205. The signal formation circuit 206 reverses, from a high level to a low level or from the low level to the high level, a level of a turn on control signal applied to a terminal 110.

The booster circuit 207 boosts the power supply voltage Vin and causes the boosted power supply voltage Vin to be an output voltage, and conducts, to an LED group 211, an output electric current Io in accordance with the turn on control signal. For example, the electric current detection circuit 208 detects a voltage between both ends of each of resistances which are serially connected with the LED group 211, and supplies the voltage to a control circuit 271 of the booster circuit 207. The control circuit 271 carries out constant current control so that an average of electric currents flowing to the LED group 211 is constant.

The output switch circuit 205 is parallel-connected with the LED group 211, and in sync with the turn on control signal, forces attenuation of the output electric current flowing from the booster circuit 207 during a turn off period of the LED group 211.

CITATION LIST

Patent Literatures

Patent Literature 1
Japanese Patent Application Publication, Tokukai, No. 2006-210435 A (Publication Date: Aug. 10, 2006)
Patent Literature 2
Japanese Patent Application Publication, Tokukai, No. 2010-15883 A (Publication Date: Jan. 21, 2010)

SUMMARY OF INVENTION

Technical Problem

According to the configurations of Patent Literatures 1 and 2, which configurations are illustrated in respective FIGS. 9 and 10, the output voltage of the booster circuit decreases and attenuates during an off period, and when the off period shifts to an on period, the output voltage of the booster circuit, which output voltage has decreased and attenuated during the off period, starts increasing and exceeds an LED turn on voltage threshold, so that the LED is turned on.

However, the on period is extremely short in a case where a light emitting brightness of the LED is desired to be extremely low. This causes a problem such that the LED cannot be turned on because the on period is ended before the output voltage of the booster circuit, which output voltage starts increasing at the start of the on period, exceeds the LED turn on voltage threshold.

An object of the present invention is to provide an LED drive device which is capable of turning on an LED even if an on period of an on/off signal for turning on/off the LED is short.

Solution to Problem

In order to attain the object, an LED drive device of an embodiment of the present invention is an LED drive device for driving an LED in a switching mode, including: a booster circuit; and a switching section for, (i) during an on period in which an on/off signal specifying turning on/off of a switching element specifies turning on of the switching element, feeding back, to the booster circuit, an electric current flowing to the LED, and (ii) during an off period in which the on/off signal specifies turning off of the switching element, feeding back, to the booster circuit, a voltage signal obtained by dividing an output voltage of the booster circuit.

Advantageous Effects of Invention

According to the LED drive device of the present invention, during the off period in which the on/off signal specifies turning off of the switching element, the voltage signal obtained by dividing the output voltage of the booster circuit is fed back to the booster circuit. This prevents a decrease in output voltage of the booster circuit during the off period in a case where an LED turn on time is short. Accordingly, a decrease in booster circuit output voltage can be prevented even if the LED turn on time is short. This makes it possible to provide an LED drive circuit which is capable of turning on an LED even if an LED turn on time is short, the LED turn on time being an on period of an on/off signal for turning on/off the LED.

Figure 2:
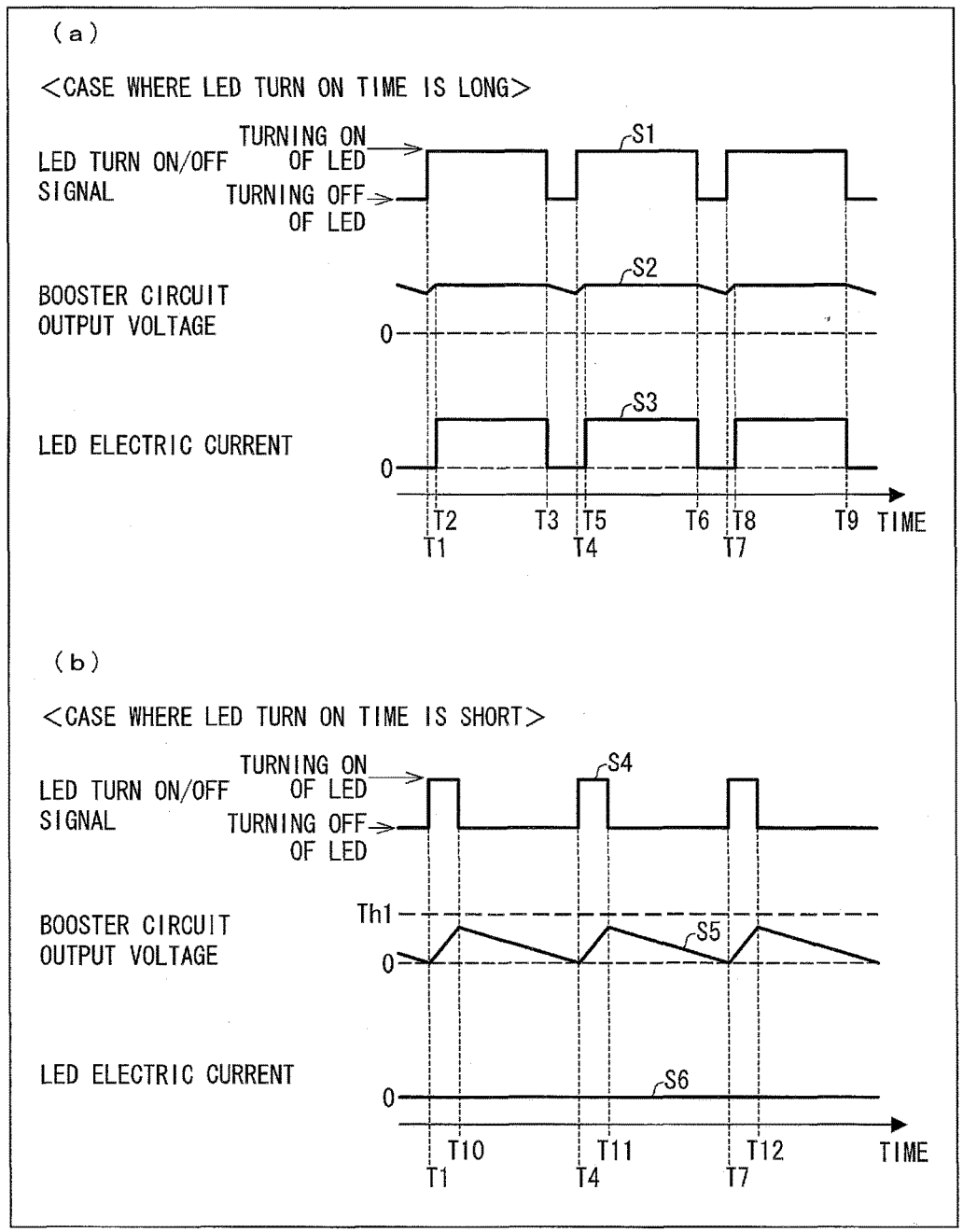

(a) and (b) of FIG. 2 are, waveform charts each illustrating an operation of, an LED drive device of a comparative example.

Figure 3:
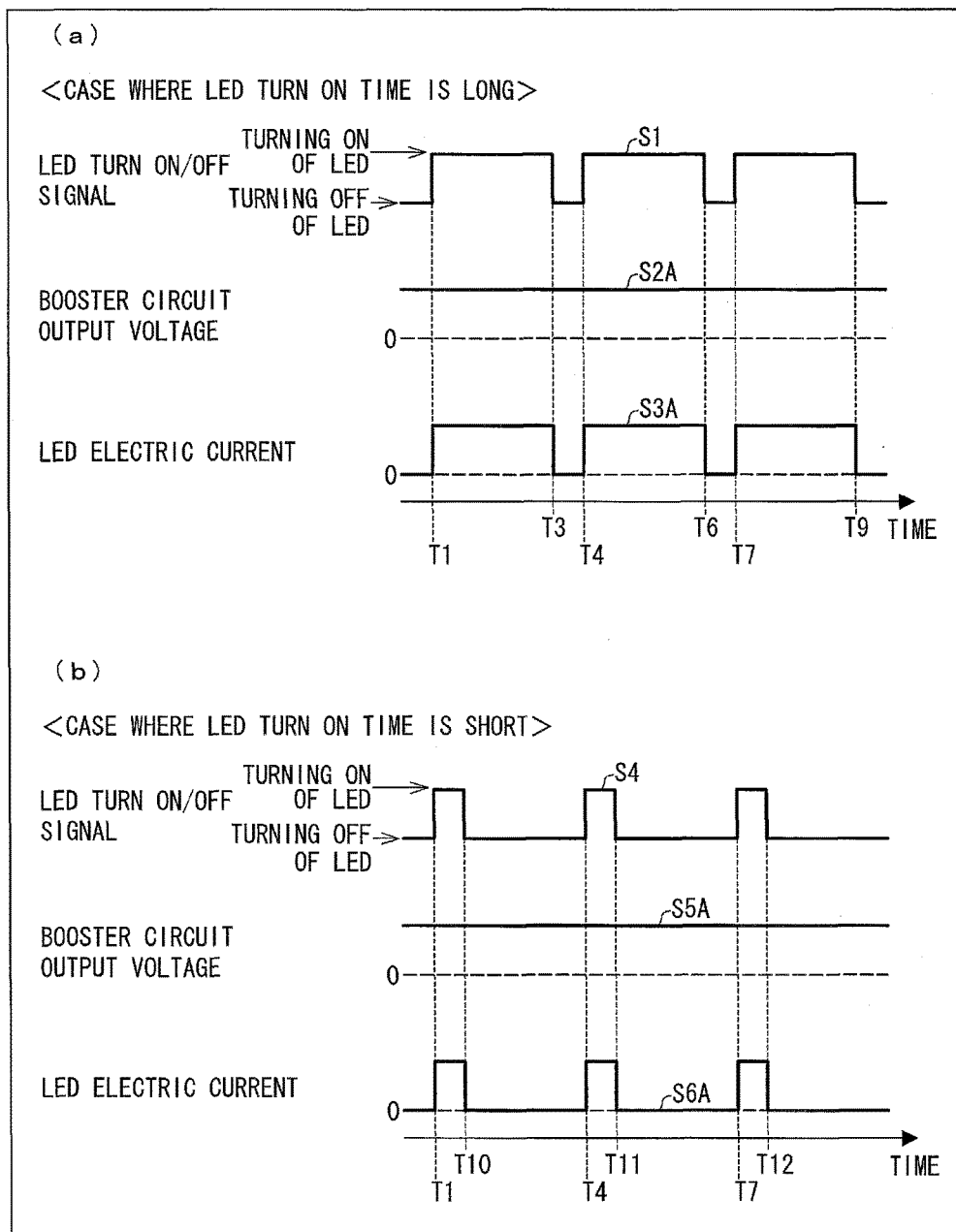

(a) and (b) of FIG. 3 are waveform charts each illustrating an operation of the LED drive device of Embodiment 1.

Figure 4:
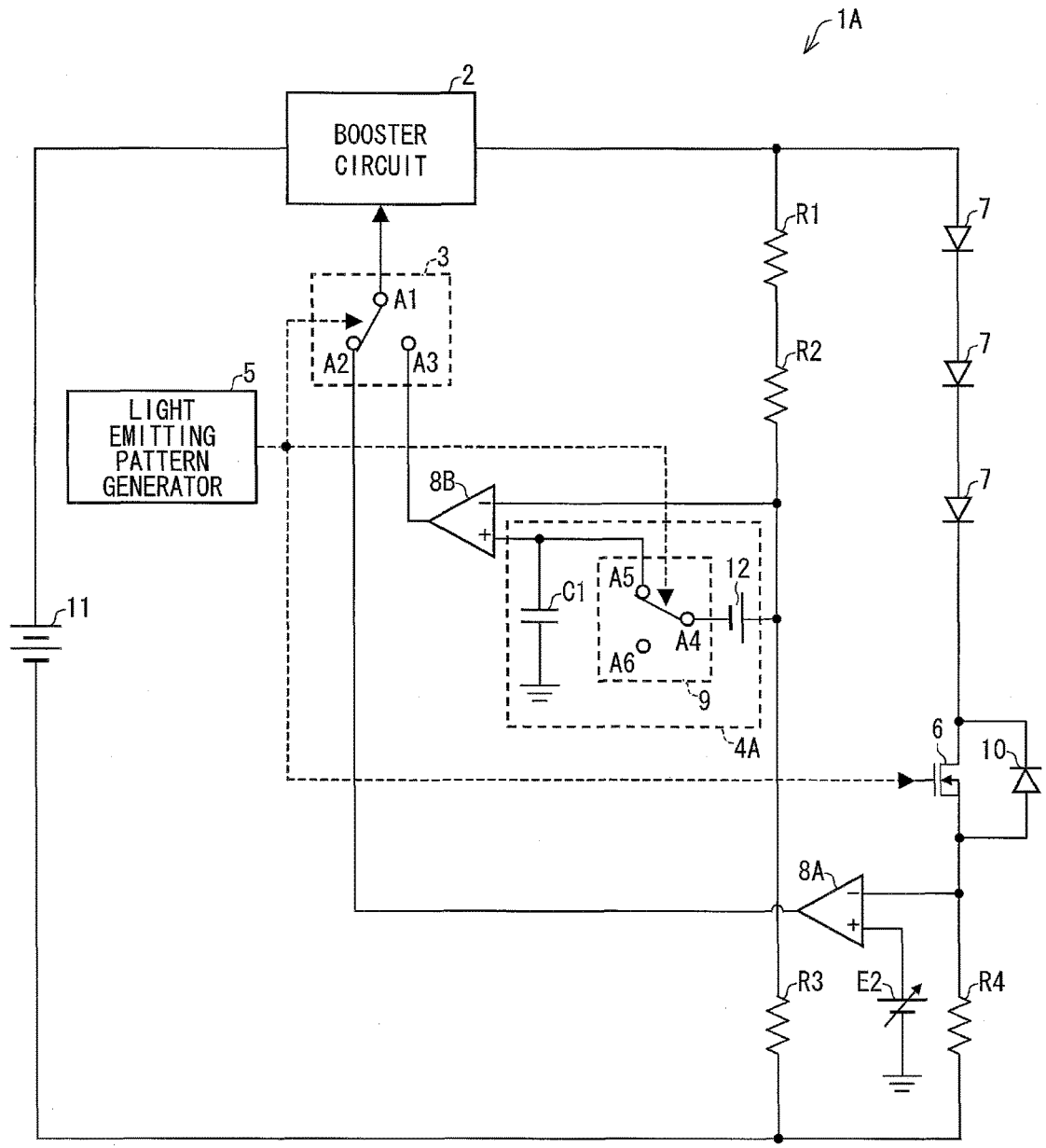

FIG. 4 is a circuit diagram illustrating an LED drive device of Embodiment 2.

Figure 5:
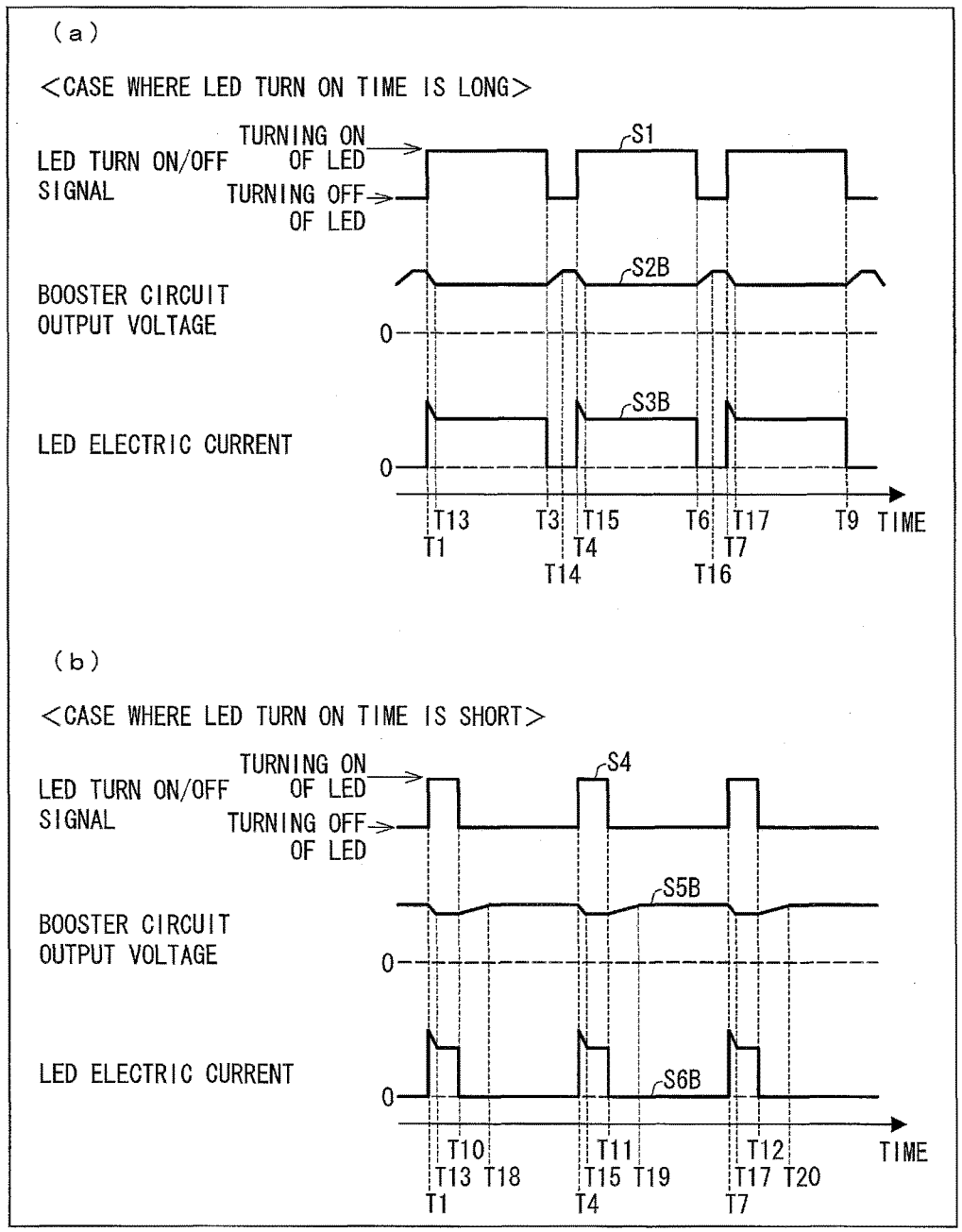

(a) and (b) of FIG. 5 are waveform charts each illustrating an operation of an LED drive device of another comparative example.

Figure 6:
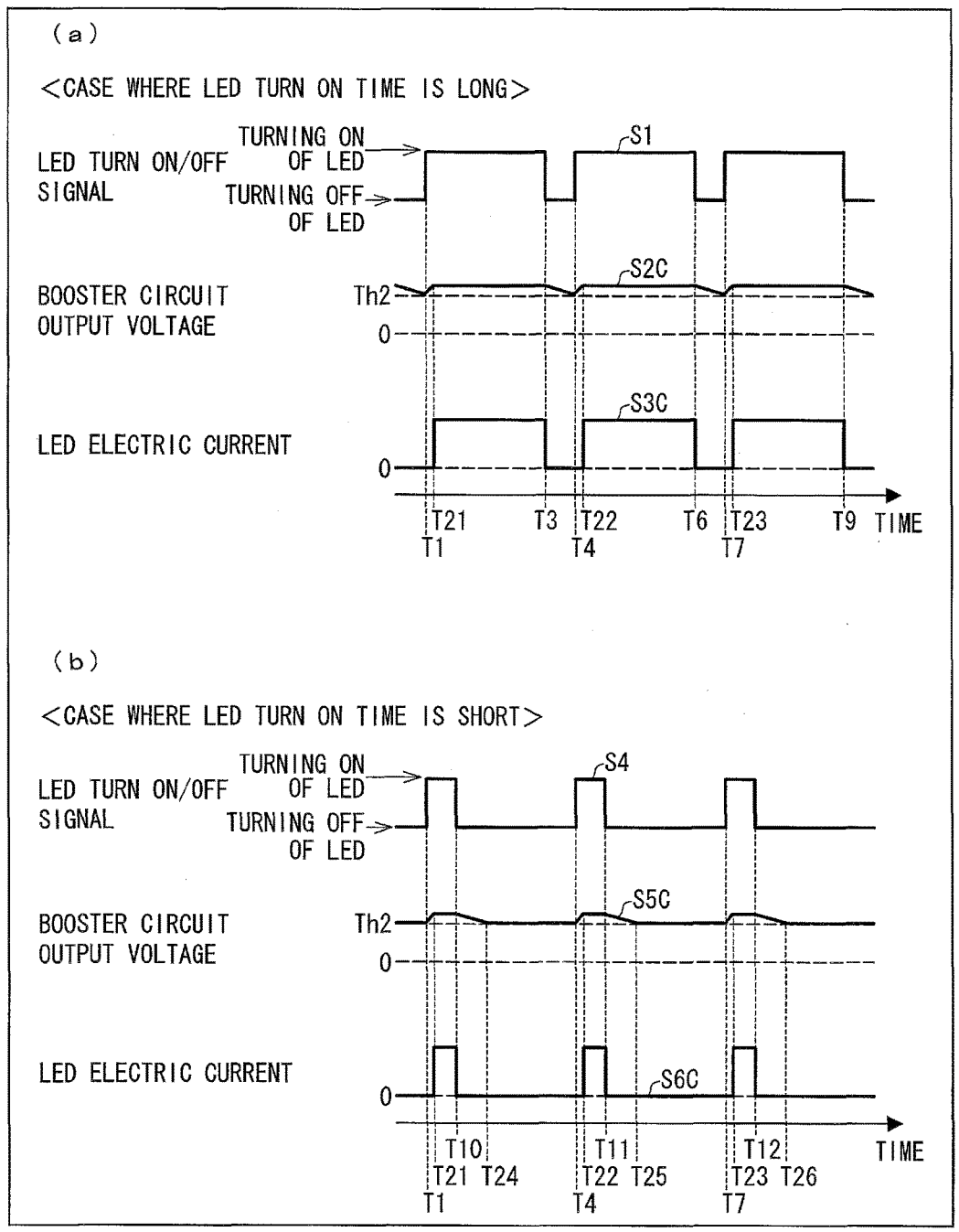

(a) and (b) of FIG. 6 are waveform charts each illustrating an operation of the LED drive device of Embodiment 2.

Figure 7:
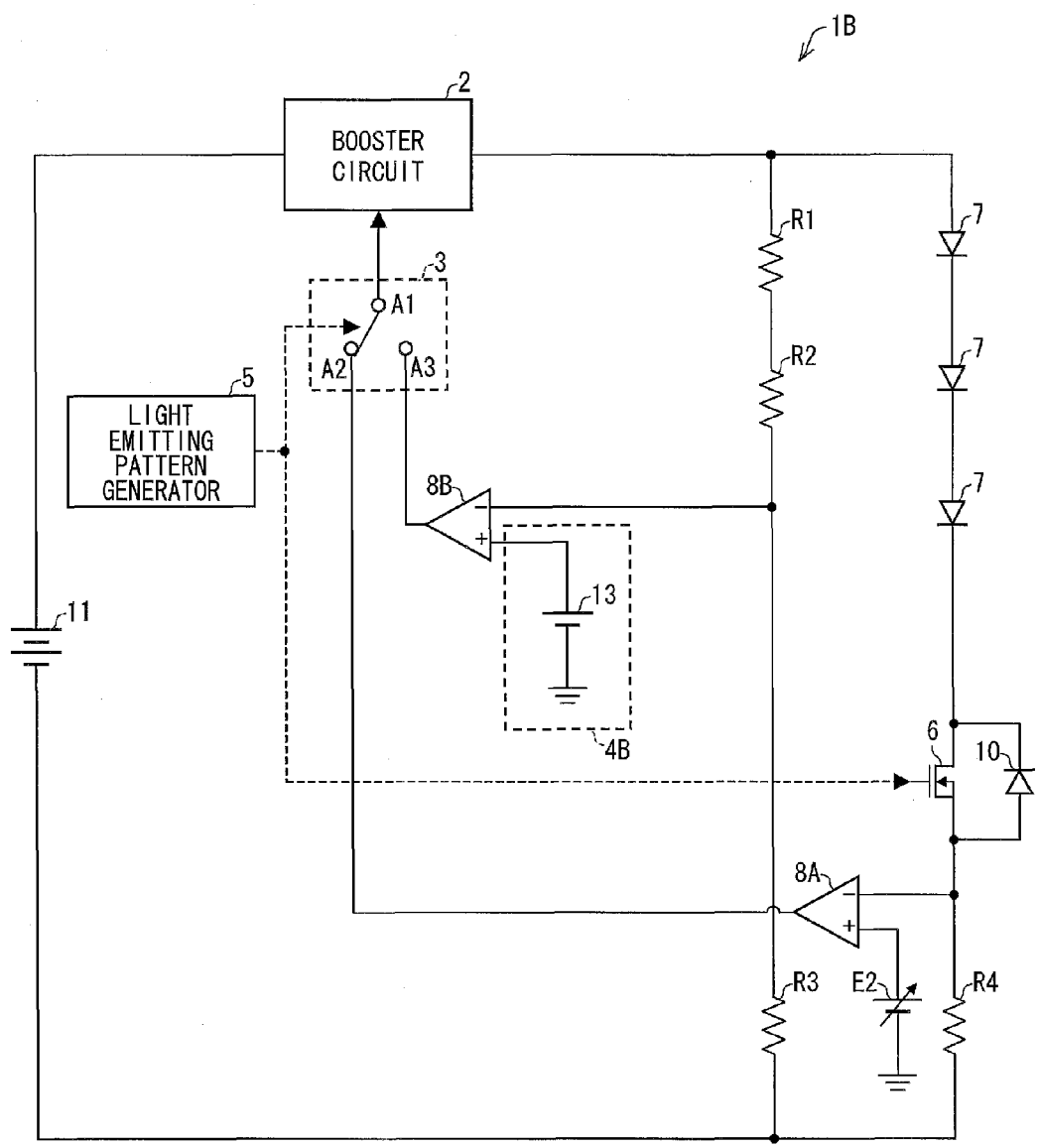

FIG. 7 is a circuit diagram illustrating a configuration of an LED drive device of Embodiment 3.

Figure 8:
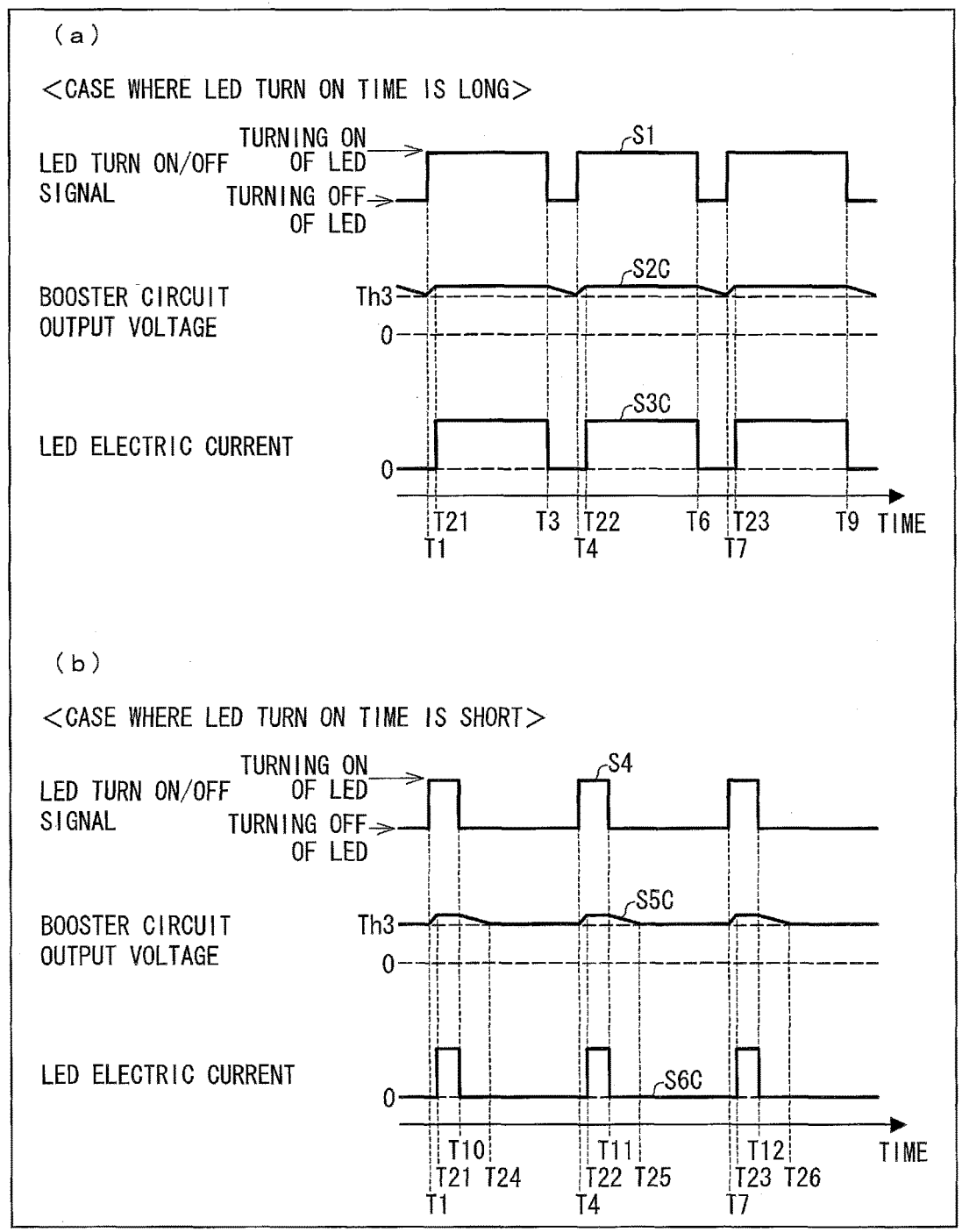

(a) and (b) of FIG. 8 are waveform charts each illustrating an operation of the LED drive device of Embodiment 3.

Figure 9:
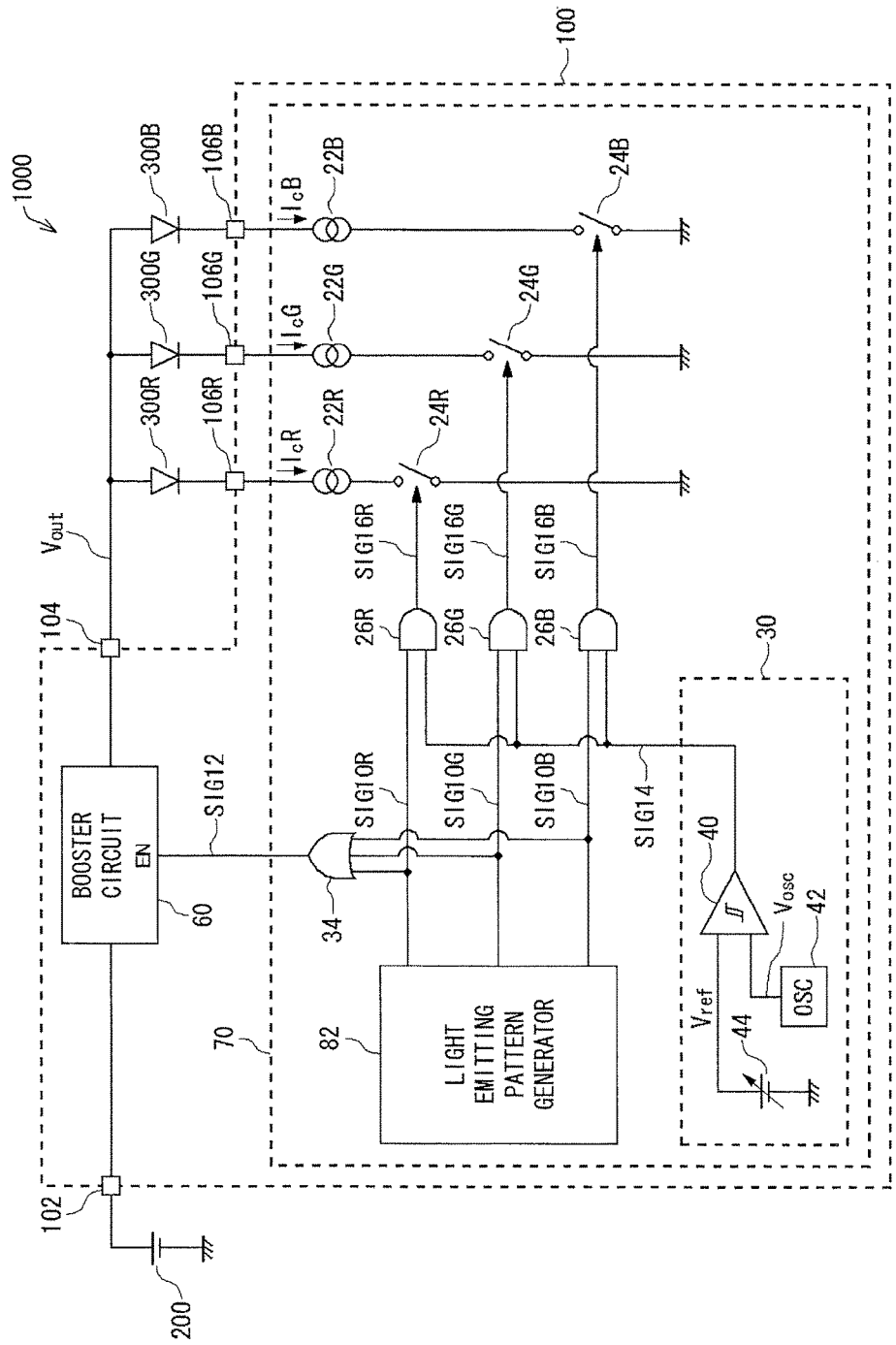

FIG. 9 is a circuit diagram illustrating a configuration of a conventional LED drive device.

Figure 10:
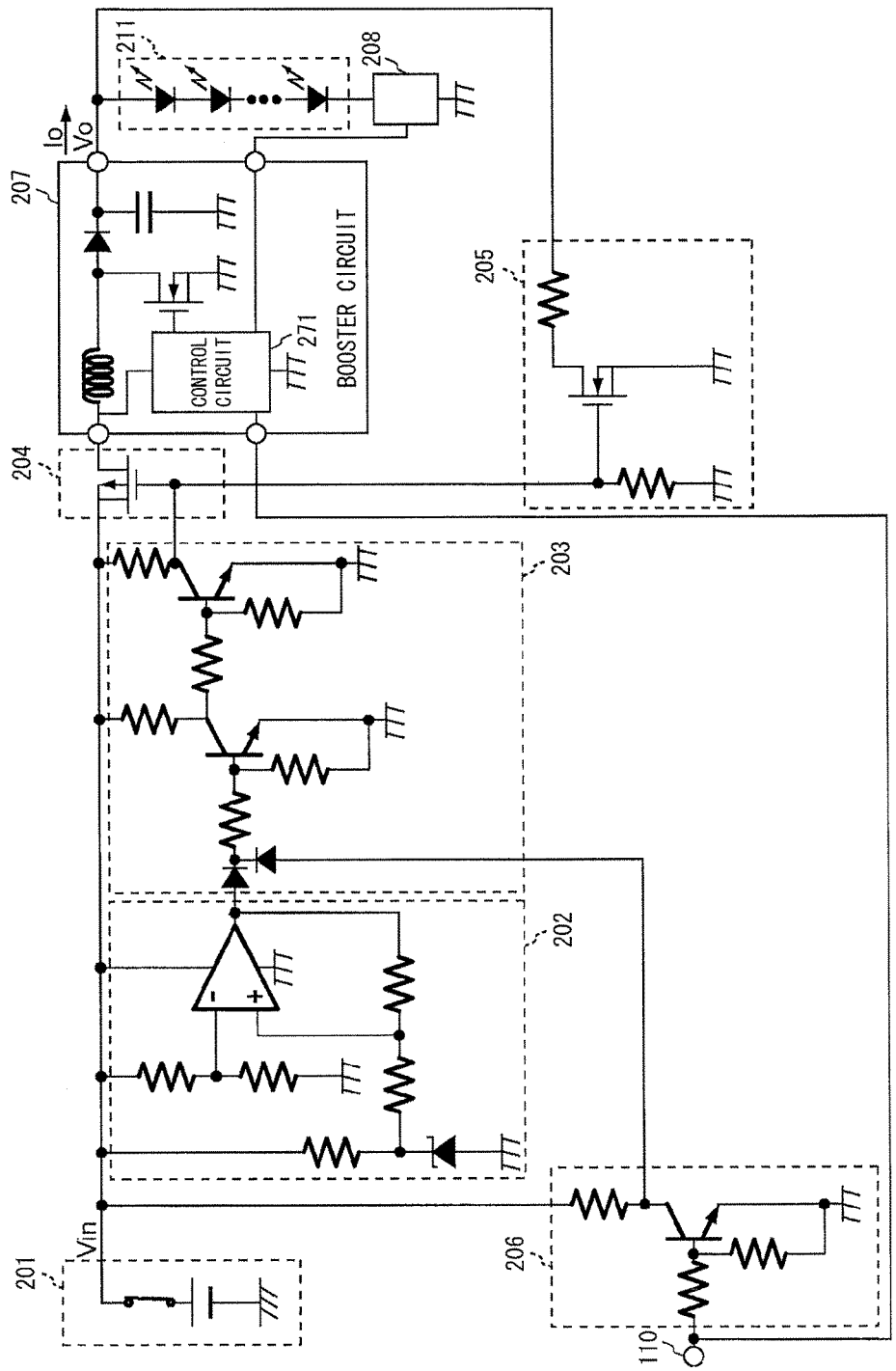

FIG. 10 is a circuit diagram illustrating a configuration of another conventional LED drive device.

DESCRIPTION OF EMBODIMENTS

An embodiment of the present invention is specifically described below.

Embodiment 1

According to an LED drive device 1 of Embodiment 1, during turning on of an LED, an output voltage is adjusted by adjustment of oscillation of a booster circuit so that an LED electric current has a desired value (electric current control is carried out). Meanwhile, during turning off of the LED, oscillation of the booster circuit is adjusted so that the output voltage of the booster circuit during turning on of the LED is maintained (voltage control is carried out). According to this, even if an LED turn on time is short, the output voltage of the booster circuit is prevented from decreasing, so that the LED can be turned on.

(Configuration of LED Drive Device 1)

Figure 1:
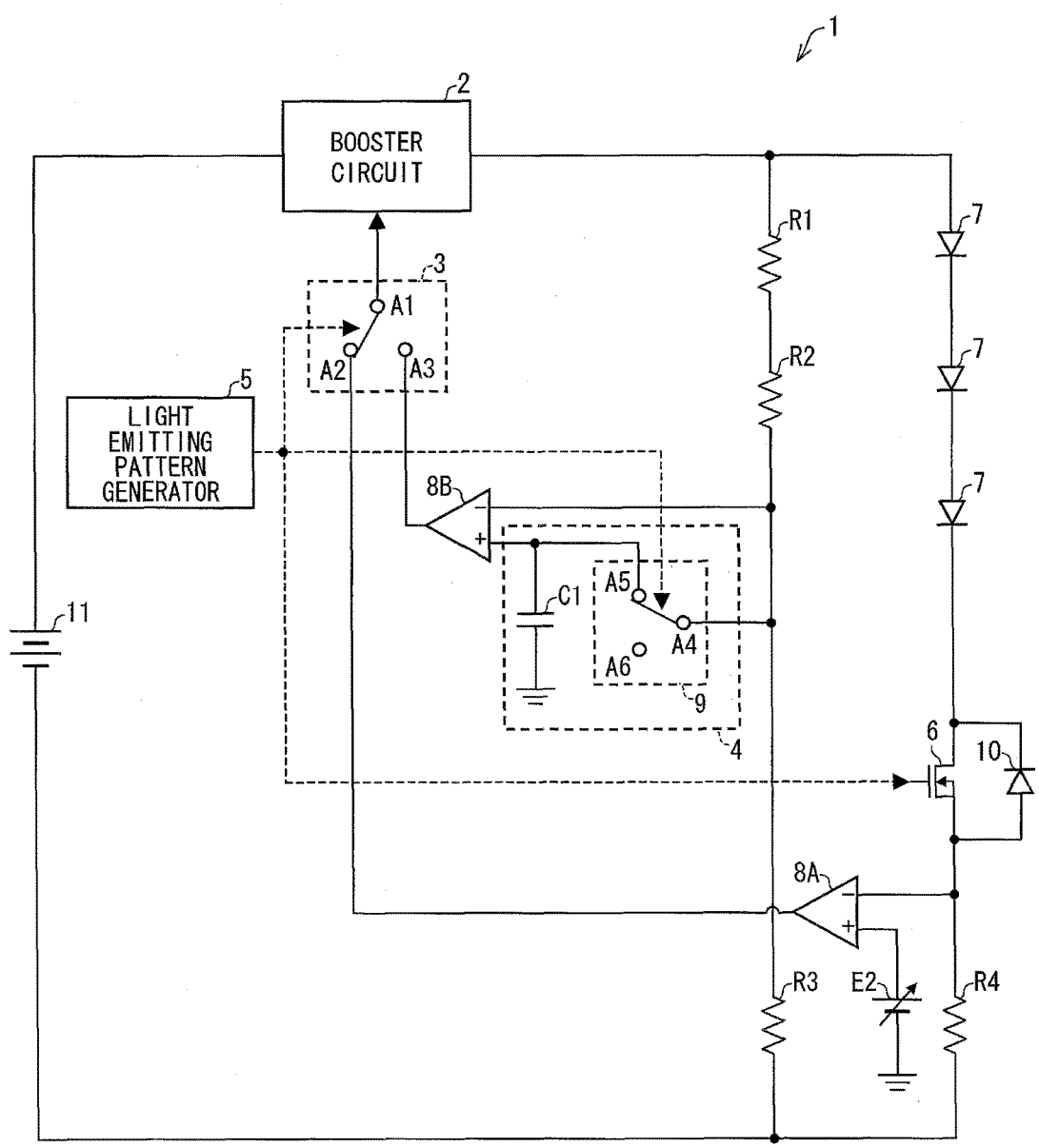
FIG. 1 is a circuit diagram illustrating a configuration of an LED drive device of Embodiment 1.

FIG. 1 is a circuit diagram illustrating a configuration of the LED drive device 1 of Embodiment 1. The LED drive device 1 includes a booster circuit 2. The booster circuit 2 has an input which is connected with one end of a power supply 11. The booster circuit 2 has an output which is connected with an LED 7 of three LEDs 7 that are serially connected, the LED 7 being located at one end of the three LEDs. Note that FIG. 1 shows an example in which the number of the LEDs is three. However, the present invention is not limited to such an example. The number of the LEDs may be one, or two or more other than three.

An LED 7 of the LEDs 7, whose number is one, or two or more, the LED 7 being located at the other end of the LEDs 7, is connected with a drain of a transistor 6 (switching element). The transistor 6 has a source which is connected via a resistance R4 with the other end of the power supply 11. The transistor 6 includes a parasitic diode 10.

The LED drive device 1 includes a light emitting pattern generator 5. The light emitting pattern generator 5 generates a signal indicative of a light emitting pattern of an LED 7 and supplies the signal to a gate of the transistor 6.

The LED drive device 1 includes an amplifier 8A. The amplifier 8A has an inverting input terminal which is connected between the source of the transistor 6 and the resistance R4. The amplifier 8A has a non-inverting input terminal which is grounded via a variable power supply E2. The amplifier 8A has an output which is connected with a terminal A2 of a switching switch 3.

The LED drive device 1 includes an amplifier 8B and a storage circuit 4. The storage circuit 4 includes a switch 9. The switch 9 has terminals A4, A5, and A6. The terminal A4 and an inverting input terminal of the amplifier 8B are each connected with the output of the booster circuit 2 via resistances R1 and R2 which are serially connected. The terminal A5 is connected with each of a non-inverting input terminal of the amplifier 8B and one of terminals of a capacitor C1. The other of the terminals of the capacitor C1 is grounded. The switch 9 causes the terminal A4 to be connected with either the terminal A5 or the terminal A6 in accordance with an output of the light emitting pattern generator 5.

The amplifier 8B has an output which is connected with a terminal A3 of the switching switch 3. The switching switch 3 has a terminal A1 which is connected with a feedback terminal of the booster circuit 2. The switching switch 3 causes the terminal A1 to be connected with either the terminal A2 or the terminal A3 in accordance with the output of the light emitting pattern generator 5.

A resistance R3 has (i) one end which is connected with an end of the resistance R2 which end is opposite from the resistance R1 side end of the resistance R2 and (ii) the other end which is connected between the resistance R4 and the power supply 11. The terminal A4 and the inverting input terminal of the amplifier 8B are each connected between the resistance R2 and the resistance R3.

(Operation of LED Drive Device of Comparative Example)

(a) and (b) of FIG. 2 are waveform charts each illustrating an operation of an LED drive device of a comparative example. According to the LED drive device of the comparative example, an output voltage S2 of a booster circuit decreases and attenuates during a turn off period (off period) of an LED, and when the turn off period of the LED shifts to a turn on period of the LED, the output voltage S2 of the booster circuit, which output voltage S2 has decreased and attenuated during the turn off period, starts increasing and exceeds an LED turn on voltage threshold, so that the LED is turned on. However, a turn on time (on period, e.g., period from a time T1 to a time T10) of the LED is extremely short in a case where a light emitting brightness of the LED is desired to be extremely low. This causes a problem such that the LED cannot be turned on because the turn on time of the LED is ended before an output voltage S5 of the booster circuit, which output voltage S5 starts increasing at the start of the turn on time (e.g., period from the time T1 to the time T10) of the LED, exceeds a voltage threshold Th1 of an LED turn on voltage.

First, the following description discusses, with reference to (a) of FIG. 2, an operation which is carried out in a case where the LED turn on time is long. At the time T1, a level of an LED turn on/off signal S1 rises from a low level indicative of turning off of the LED to a high level indicative of turning on of the LED, and the booster circuit output voltage S2 starts increasing. Then, at the time T2, when the booster circuit output voltage S2 reaches the voltage threshold Th1 at which the LED is turned on, a level of an LED electric current S3 rises from a low level to a high level, and the LED 7 is turned on.

Subsequently, at the time T3, when the level of the LED turn on/off signal S1 falls from the high level to the low level, the booster circuit output voltage S2 starts decreasing from the voltage threshold Th1, the level of the LED electric current S3 falls from the high level to the low level, and the LED 7 is turned off.

Thereafter, at the time T4, when the level of the LED turn on/off signal S1 rises from the low level to the high level, the booster circuit output voltage S2 having continued decreasing is reversed to start increasing. Subsequently, at the time T5, when the booster circuit output voltage S2 reaches the voltage threshold Th1, the level of the LED electric current S3 rises from the low level to the high level, and the LED 7 is turned on.

Subsequently, at the time T6, when the level of the LED turn on/off signal S1 falls from the high level to the low level, the booster circuit output voltage S2 starts decreasing from the voltage threshold Th1, the level of the LED electric current S3 falls from the high level to the low level, and the LED 7 is turned off.

Thereafter, at the time T7, when the level of the LED turn on/off signal S1 rises from the low level to the high level, the booster circuit output voltage S2 having continued decreasing is reversed to start increasing. Subsequently, at the time T8, when the booster circuit output voltage S2 reaches the voltage threshold Th1, the level of the LED electric current S3 rises from the low level to the high level, and the LED 7 is turned on.

Subsequently, at the time T9, when the level of the LED turn on/off signal S1 falls from the high level to the low level, the booster circuit output voltage S2 starts decreasing from the voltage threshold Th1, the level of the LED electric current S3 falls from the high level to the low level, and the LED 7 is turned off.

Next, the following description discusses, with reference to (b) of FIG. 2, an operation which is carried out in a case where the LED turn on time is short. At the time T1, a level of an LED turn on/off signal S4 rises from a low level indicative of turning off of the LED to a high level indicative of turning on of the LED, and the booster circuit output voltage S5 starts increasing. Then, at the time T10, when the level of the LED turn on/off signal S4 falls from the high level to the low level, the booster circuit output voltage S5 finishes an increasing operation before reaching the voltage threshold Th1 and starts a decreasing operation. The LED electric current is maintained at the low level, and the LED 7 continues to be off.

Subsequently, at the time T4, when the level of the LED turn on/off signal S4 rises from the low level to the high level, the booster circuit output voltage S5 having continued decreasing starts increasing again. The LED electric current is maintained at the low level, and the LED 7 continues to be off.

Then, at a time T11, when the level of the LED turn on/off signal S4 falls from the high level to the low level, the booster circuit output voltage S5 finishes the increasing operation before reaching the voltage threshold Th1 and starts the decreasing operation. The LED electric current is maintained at the low level, and the LED 7 continues to be off. Thereafter, operations identical to those described above are repeatedly carried out at the time T7 and a time T12.

(a) and (b) of FIG. 3 are waveform charts each illustrating an operation of the LED drive device 1 of Embodiment 1. As illustrated in (a) and (b) of FIG. 3, as in the case of a general LED driver, during turning on of the LED, the LED drive device 1 of Embodiment 1 detects the LED electric current and adjusts the output voltage of the booster circuit 2 so as to cause the LED electric current to be constant. During turning off of the LED, the LED drive device 1 of Embodiment 1 detects the output voltage of the booster circuit 2 and maintains the output voltage of the booster circuit 2 at a constant value so as to cause the output voltage of the booster circuit 2 to be the output voltage during turning on of the LED.

According to this, though the general LED driver makes it impossible to turn on the LED in a case where the LED turn on time is short (described earlier with reference to (b) of FIG. 2), Embodiment 1 makes it possible to turn on the LED even in a case where the LED turn on time is short.

First, the following description discusses, with reference to (a) of FIG. 3, an operation which is carried out in a case where the LED turn on time is long. At a time T1, when the light emitting pattern generator 5 raises a level of an LED turn on/off signal S1 from a low level indicative of turning off of the LED to a high level indicative of turning on of the LED, the transistor 6 is turned on, the switching switch 3 is switched to the terminal A2 corresponding to the LED electric current, and the switch 9 is switched to the terminal A5. This causes the output voltage of the booster circuit 2 to be stored in the capacitor C1 of the storage circuit 4.

A booster circuit output voltage S2A is maintained at a value which is not less than the voltage threshold Th1 at which the LED 7 is turned on. In response to the turning on of the transistor 6, a level of an LED electric current S3A rises from a low level to a high level, and the LED 7 is turned on. Then, the LED electric current is fed back to the booster circuit 2 via the terminal A2.

Subsequently, at a time T3, when the light emitting pattern generator 5 lowers the level of the LED turn on/off signal S1 from the high level to the low level, the transistor 6 is turned off, the level of the LED electric current S3A falls from the high level to the low level, and the LED 7 is turned off.

In accordance with the fall of the LED turn on/off signal S1, the switch 9 is switched from the terminal A5 to the terminal A6, and the switching switch 3 is switched to the terminal A3. Therefore, a voltage corresponding to the output voltage of the booster circuit 2, which output voltage is stored in the capacitor C1 of the storage circuit 4, is fed back to the booster circuit 2 via the terminal A3. This causes the booster circuit output voltage S2A to be continuously maintained at a value which is not less than the voltage threshold Th1.

Thereafter, at a time T4, when the light emitting pattern generator 5 raises the level of the LED turn on/off signal S1 from the low level to the high level, the transistor is turned on again, and the switching switch 3 is switched to the terminal A2 again, and the switch 9 is switched to the terminal A5 again. This causes the output voltage of the booster circuit 2 to be stored in the capacitor C1 of the storage circuit 4 again and causes the LED electric current to be fed back to the booster circuit 2 via the terminal A2.

The booster circuit output voltage S2A is maintained at the value which is not less than the voltage threshold Th1. In response to the turning on of the transistor 6, the level of the LED electric current S3A rises from the low level to the high level, and the LED 7 is turned on again.

Thereafter, operations identical to those described above are repeatedly carried out at a time T6, a time T7 and a time T9.

Next, the following description discusses, with reference to (b) of FIG. 3, an operation which is carried out in a case where the LED turn on time is short. At the time T1, when the light emitting pattern generator 5 raises a level of an LED turn on/off signal S4 from a low level indicative of turning off of the LED to a high level indicative of turning on of the LED, the transistor 6 is turned on, the switching switch 3 is switched to the terminal A2 corresponding to the LED electric current, and the switch 9 is switched to the terminal A5. This causes the output voltage of the booster circuit 2 to be stored in the capacitor C1 of the storage circuit 4.

A booster circuit output voltage S5A is maintained at a value which is not less than the voltage threshold Th1 at which the LED 7 is turned on. In response to the turning on of the transistor 6, a level of an LED electric current S6A rises from a low level to a high level, and the LED 7 is turned on. Then, the LED electric current is fed back to the booster circuit 2 via the terminal A2.

Subsequently, at a time T10, when the light emitting pattern generator 5 lowers the level of the LED turn on/off signal S4 from the high level to the low level, the transistor 6 is turned off, the level of the LED electric current S6A falls from the high level to the low level, and the LED 7 is turned off.

In accordance with the fall of the LED turn on/off signal S4, the switch 9 is switched from the terminal A5 to the terminal A6, and the switching switch 3 is switched to the terminal A3. Therefore, a voltage corresponding to the voltage is stored in the capacitor C1 of the storage circuit 4, is fed back to the booster circuit 2 via the terminal A3. This causes the booster circuit output voltage S5A to be continuously maintained at a value which is not less than the voltage threshold Th1.

Thereafter, at the time T4, when the light emitting pattern generator 5 raises the level of the LED turn on/off signal S4 from the low level to the high level, the transistor is turned on again, and the switching switch 3 is switched to the terminal A2 again, and the switch 9 is switched to the terminal A5 again. This causes the output voltage of the booster circuit 2 to be stored in the capacitor C1 of the storage circuit 4 again and causes the LED electric current to be fed back to the booster circuit 2 via the terminal A2.

The booster circuit output voltage S5A is maintained at the value which is not less than the voltage threshold Th1. In response to the turning on of the transistor 6, the level of the LED electric current S6A rises from the low level to the high level, and the LED 7 is turned on again.

Thereafter, operations identical to those described above are repeatedly carried out at a time T11, the time T7 and a time T12.

(Effect of Embodiment 1)

As described earlier, during turning on of the LED, the LED electric current is fed back, and the output voltage is adjusted by adjustment of oscillation of the booster circuit 2 so that the LED electric current has a desired value (electric current control is carried out). Meanwhile, during turning off of the LED, oscillation of the booster circuit 2 is adjusted so that the output voltage of the booster circuit 2 during turning on of the LED is maintained (voltage control is carried out). According to this, even if the LED turn on time is short, the output voltage of the booster circuit 2 is prevented from decreasing, so that the LED can be turned on.

According to the configuration of Patent Literature 1, which configuration has been described with reference to FIG. 9, the LED electric current is fed back to the booster circuit during turning on of the LED, and oscillation of the booster circuit is stopped during turning off of the LED. Meanwhile, according to Embodiment 1, during turning on of the LED, the LED electric current is fed back to the booster circuit, and during turning off of the LED, the output voltage of the booster circuit is fed back to the booster circuit so that an output of the booster circuit during turning on of the LED is maintained.

Therefore, according to the configuration of FIG. 9, the LED cannot be turned on when the LED turn on time is short. In contrast, according to Embodiment 1, even if the LED turn on time is shortened, the LED can be turned on.

According to the configuration of Patent Literature 2, which configuration has been described with reference to FIG. 10, the LED is turned on/off mainly by turning on/off the booster circuit. Meanwhile, according to Embodiment 1, the LED is turned on/off by causing the transistor 6 (switch) such as an FET to bring an LED circuit into/out of conduction.

Therefore, as compared with Embodiment 1, the configuration of FIG. 10, which configuration has improved with a discharging circuit added, is slower in speed at which the LED is turned on/off. As in Embodiment 1, the LED can be turned on/off at a higher speed by causing the switch such as an FET to directly bring the LED circuit into/out of conduction.

Embodiment 1 shows an example in which the LED drive device 1 includes the light emitting pattern generator 5 for generating the on/off signal specifying turning on/off of the transistor 6. Note, however, that the present invention is not limited to such an example. The present invention may be configured such that the on/off signal specifying turning on/off of the transistor 6 is received from an outside of the LED drive device 1. Same applies to embodiments described later.

Embodiment 2

Configuration of LED Drive Device 1A

FIG. 4 is a circuit diagram illustrating an LED drive device 1A of Embodiment 2. Members identical to those described earlier are given respective identical reference numerals. No specific description of those members is repeated.

The LED drive device 1A includes a storage circuit 4A. The storage circuit 4A includes a switch 9. The switch 9 has terminals A4, A5, and A6.

The terminal A4 is connected with a negative terminal of a power supply 12. A positive terminal of the power supply 12 and an inverting input terminal of an amplifier 8B are each connected with an output of a booster circuit 2 via resistances R1 and R2 which are serially connected. The terminal A5 is connected with each of a non-inverting input terminal of the amplifier 8B and one of terminals of a capacitor C1. The other of the terminals of the capacitor C1 is grounded. The switch 9 causes the terminal A4 to be connected with either the terminal A5 or the terminal A6 in accordance with an output of a light emitting pattern generator 5.

(Operation of LED Drive Device of Comparative Example)

(a) and (b) of FIG. 5 are waveform charts each illustrating an operation of an LED drive device of another comparative example. The LED drive device of the another comparative example has a problem such that, in a case where a noise, a variation in component, and/or the like cause(s) a booster circuit to have a higher output voltage during turning off of an LED than during turning on of the LED, an LED electric current which is larger than a set LED electric current flows during turning on of the LED.

First, the following description discusses, with reference to (a) of FIG. 5, an operation which is carried out in a case where an LED turn on time is long. At a time T1, a level of an LED turn on/off signal S1 rises from a low level indicative of turning off of the LED to a high level indicative of turning on of the LED, and a booster circuit output voltage S2B starts decreasing. A level of an LED electric current S3B rises from a low level to a high level which is higher than a set high level, and the LED electric current S3B starts decreasing. Then, the booster circuit output voltage S2B and the LED electric current S3B each finish decreasing at a time T13.

Subsequently, when the level of the LED turn on/off signal S1 falls from the high level to the low level at a time T3, the booster circuit output voltage S2B increases, by a noise, a variation in component, and/or the like, to a voltage which is higher than the booster circuit output voltage during turning on of the LED. The level of the LED electric current S3B falls from the high level to the low level. Thereafter, the booster circuit output voltage S2B stops increasing at a time T14.

Then, at a time T4, when the level of the LED turn on/off signal S1 rises from the low level to the high level, the booster circuit output voltage S2B starts decreasing, the level of the LED electric current S3B rises from the low level to the high level which is higher than the set high level, and the LED electric current S3B starts decreasing. Subsequently, the booster circuit output voltage S2B and the LED electric current S3B each finish decreasing at a time T15.

Thereafter, operations identical to those described above are repeatedly carried out at a time T6, a time T16, a time T7, a time T17, and a time T9.

Next, the following description discusses, with reference to (b) of FIG. 5, an operation which is carried out in a case where the LED turn on time is short. At the time T1, a level of an LED turn on/off signal S4 rises from a low level indicative of turning off of the LED to a high level indicative of turning on of the LED, and a booster circuit output voltage S5B starts decreasing. A level of an LED electric current S6B rises from a low level to a high level which is higher than a set high level, and the LED electric current S6B starts decreasing. Then, the booster circuit output voltage S2B and the LED electric current S3B each finish decreasing at the time T13.

Subsequently, when the level of the LED turn on/off signal S4 falls from the high level to the low level at a time T10, the booster circuit output voltage S5B increases, by a noise, a variation in component, and/or the like, to a voltage which is higher than the booster circuit output voltage during turning on of the LED. The level of the LED electric current S6B falls from the high level to the low level. Thereafter, the booster circuit output voltage S5B stops increasing at a time T18.

Then, at the time T4, when the level of the LED turn on/off signal S4 rises from the low level to the high level, the booster circuit output voltage S5B starts decreasing, the level of the LED electric current S6B rises from the low level to the high level which is higher than the set high level, and the LED electric current S6B starts decreasing. Subsequently, the booster circuit output voltage S5B and the LED electric current S6B each finish decreasing at the time T15.

Thereafter, operations identical to those described above are repeatedly carried out at a time T11, a time T19, the time T7, the time T17, a time T12, and a time T20.

As described earlier, the LED drive device of the another comparative example has a problem such that, in a case where a noise, a variation in component, and/or the like cause(s) the booster circuit to have a higher output voltage during turning off of the LED than during turning on of the LED in, for example, a period from the T18 to the time T4, the LED electric current which is larger than the set LED electric current flows during a period from the time T4 to a time T15, in which period the LED is on.

(Operation of LED Drive Device 1A of Embodiment 2)

(a) and (b) of FIG. 6 are waveform charts each illustrating an operation of the LED drive device 1A of Embodiment 2. As illustrated in (a) and (b) of FIG. 6, according to the LED drive device 1A of Embodiment 2, the booster circuit is set to have a slightly lower output voltage during turning off of the LED than during turning on of the LED.

As described earlier with reference to FIG. 5, in a case where a noise, a variation in component, and/or the like cause(s) the booster circuit to have a higher output voltage during turning off of the LED than during turning on of the LED, the LED electric current which is larger than the set LED electric current flows during turning on of the LED.

However, according to the configuration of Embodiment 2, the booster circuit output voltage at the start of turning on of the LED is lower than a voltage which allows the LED electric current to flow during turning on of the LED. This prevents flow of the LED electric current whose value is larger than a set value.

First, the following description discusses, with reference to (a) of FIG. 6, an operation which is carried out in a case where an LED turn on time is long. At a time T1, when the light emitting pattern generator 5 raises a level of an LED turn on/off signal S1 from a low level indicative of turning off of the LED to a high level indicative of turning on of the LED, a transistor 6 is turned on, a switching switch 3 is switched to a terminal A2 corresponding to an LED electric current, and the switch 9 is switched to the terminal A5. An output voltage of the booster circuit 2 which output voltage has been reduced by a voltage value corresponding to the power supply 12 is stored in the capacitor C1 of the storage circuit 4.

A booster circuit output voltage S2C starts increasing from a voltage value Th2 which is lower than a voltage threshold Th1 at which an LED 7 is turned on. Then, at a time T21, when the booster circuit output voltage S2C reaches the voltage threshold Th1 at which the LED 7 is turned on, a level of an LED electric current S3C rises from a low level to a high level, and the LED 7 is turned on. Then, the LED electric current is fed back to the booster circuit 2 via the terminal A2.

Thereafter, at a time T3, when the light emitting pattern generator 5 lowers the level of the LED turn on/off signal S1 from the high level to the low level, the transistor 6 is turned off, the level of the LED electric current S3C falls from the high level to the low level, and the LED 7 is turned off. The switching switch 3 is switched to a terminal A3, and the switch 9 is switched to the terminal A6. Then, the output voltage which has been reduced by the voltage value corresponding to the power supply 12 is read out from the capacitor C1 and fed back to the booster circuit 2. The booster circuit output voltage S2C starts decreasing.

Then, at a time T4, when the light emitting pattern generator 5 raises the level of the LED turn on/off signal S1 from the low level to the high level, the booster circuit output voltage S2C reaches the voltage value Th2.

Subsequently, at a time T22, when the booster circuit output voltage S2C reaches the voltage threshold Th1 at which the LED 7 is turned on, the level of the LED electric current S3C rises from the low level to the high level, and the LED 7 is turned on. Then, the LED electric current is fed back to the booster circuit 2 via the terminal A2.

Thereafter, operations identical to those described above are repeatedly carried out at a time T6, a time T7, a time T23, and a time T9.

Next, the following description discusses, with reference to (b) of FIG. 6, an operation which is carried out in a case where the LED turn on time is short. At the time T1, when the light emitting pattern generator 5 raises a level of an LED turn on/off signal S4 from a low level indicative of turning off of the LED to a high level indicative of turning on of the LED, the transistor 6 is turned on, the switching switch 3 is switched to the terminal A2 corresponding to the LED electric current, and the switch 9 is switched to the terminal A5. The output voltage of the booster circuit 2 which output voltage has been reduced by the voltage value corresponding to the power supply 12 is stored in the capacitor C1 of the storage circuit 4.

A booster circuit output voltage S5C starts increasing from the voltage value Th2 which is lower than the voltage threshold Th1 at which the LED 7 is turned on. Then, at the time T21, when the booster circuit output voltage S5C reaches the voltage threshold Th1 at which the LED 7 is turned on, a level of an LED electric current S6C rises from a low level to a high level, and the LED 7 is turned on. Then, the LED electric current is fed back to the booster circuit 2 via the terminal A2.

Thereafter, at a time T10, when the light emitting pattern generator 5 lowers the level of the LED turn on/off signal S4 from the high level to the low level, the transistor 6 is turned off, the level of the LED electric current S6C falls from the high level to the low level, and the LED 7 is turned off. The switching switch 3 is switched to the terminal A3, and the switch 9 is switched to the terminal A6. Then, the output voltage which has been reduced by the voltage value corresponding to the power supply 12 is read out from the capacitor C1 and fed back to the booster circuit 2. The booster circuit output voltage S5C starts decreasing.

Then, at a time T24, the booster circuit output voltage S5C reaches the voltage value Th2 and stops decreasing.

Subsequently, at the time T4, when the light emitting pattern generator 5 raises the level of the LED turn on/off signal S4 from the low level to the high level, the transistor 6 is turned on, the switching switch 3 is switched to the terminal A2 corresponding to the LED electric current, and the switch 9 is switched to the terminal A5. The output voltage of the booster circuit 2 which output voltage has been reduced by the voltage value corresponding to the power supply 12 is stored in the capacitor C1 of the storage circuit 4.

The booster circuit output voltage S5C starts increasing from the voltage value Th2. Then, at the time T22, when the booster circuit output voltage S5C reaches the voltage threshold Th1 at which the LED 7 is turned on, the level of the LED electric current S6C rises from the low level to the high level, and the LED 7 is turned on. Then, the LED electric current is fed back to the booster circuit 2 via the terminal A2.

Thereafter, at a time T11, when the light emitting pattern generator 5 lowers the level of the LED turn on/off signal S4 from the high level to the low level, the transistor 6 is turned off, the level of the LED electric current S6C falls from the high level to the low level, and the LED 7 is turned off. The switching switch 3 is switched to the terminal A3, and the switch 9 is switched to the terminal A6. Then, the output voltage which has been reduced by the voltage value corresponding to the power supply 12 is read out from the capacitor C1 and fed back to the booster circuit 2. The booster circuit output voltage S5C starts decreasing.

Then, at a time T25, the booster circuit output voltage S5C reaches the voltage value Th2 and stops decreasing.

Thereafter, operations identical to those described above are repeatedly carried out at the time T7, the time T23, a time T12, and a time T26.

(Effect of Embodiment 2)

As described earlier, according to the LED drive device 1A of Embodiment 2, the output voltages S2C and S5C of the booster circuit during turning off of the LED are set at the voltage value Th2, which is slightly lower than the voltage threshold Th1 at which the LED is turned on. For example, the voltage value Th2 is set at 190 V obtained based on the equation: voltage value Th2=voltage threshold Th1—(voltage of the power supply 12 illustrated in FIG. 4 (=10 V))=190 V where voltage threshold Th1=200 V.

As described earlier with reference to FIG. 5, in a case where a noise, a variation in component, and/or the like cause(s) the booster circuit to have a higher output voltage during turning off of the LED than during turning on of the LED, the LED electric current which is larger than the set LED electric current flows during turning on of the LED.

However, according to the configuration of Embodiment 2, the booster circuit output voltage S5C at the start of turning on of the LED is the voltage Th2, which is lower than the voltage Th1 which allows the LED electric current to flow during turning on of the LED. This offsets an increase in booster circuit output voltage during turning off of the LED and prevents flow of the LED electric current whose value is larger than a set value.

Embodiment 3

Configuration of LED Drive Device 1B of Embodiment 3

FIG. 7 is a circuit diagram illustrating an LED drive device 1B of Embodiment 3. Members identical to those described earlier are given respective identical reference numerals. No specific description of those members is repeated.

The LED drive device 1B includes a voltage supply section 4B. The voltage supply section 4B includes a power supply 13. The power supply 13 has a positive terminal which is connected with a non-inverting input terminal of an amplifier 8B and a negative terminal which is grounded.

(Operation of LED drive device 1B of Embodiment 3)

(a) and (b) of FIG. 8 are waveform charts each illustrating an operation of the LED drive device 1B of Embodiment 3. As illustrated in (a) and (b) of each of FIGS. 7 and 8, it is possible to set output voltages S2C and S5C of a booster circuit during turning off of an LED at a predetermined voltage value Th3 instead of adjusting the output voltages S2C and S5C in accordance with an output voltage during turning on of the LED.

This eliminates the need for a circuit for storing booster electric power during turning on of the LED, so that a simpler circuit can be realized.

First, the following description discusses, with reference to (a) of FIG. 8, an operation which is carried out in a case where an LED turn on time is long. At a time T1, when a light emitting pattern generator 5 raises a level of an LED turn on/off signal S1 from a low level indicative of turning off of the LED to a high level indicative of turning on of the LED, a transistor 6 is turned on, and a switching switch 3 is switched to a terminal A2 corresponding to an LED electric current. An output voltage of a booster circuit 2 which output voltage is divided by resistances R1, R2, and R3 is supplied to the non-inverting input terminal of the amplifier 8B.

A booster circuit output voltage S2C starts increasing from the predetermined voltage value Th3. Then, at a time T21, when the booster circuit output voltage S2C reaches a voltage threshold Th1 at which an LED 7 is turned on, a level of an LED electric current S3C rises from a low level to a high level, and the LED 7 is turned on. Then, the LED electric current is fed back to the booster circuit 2 via the terminal A2.

Thereafter, at a time T3, when the light emitting pattern generator 5 lowers the level of the LED turn on/off signal S1 from the high level to the low level, the transistor 6 is turned off, the level of the LED electric current S3C falls from the high level to the low level, and the LED 7 is turned off. The switching switch 3 is switched to a terminal A3, and a voltage corresponding to the predetermined voltage value Th3 is fed back to the booster circuit 2 via the switch A3. The booster circuit output voltage S2C starts decreasing.

Then, at a time T4, when the light emitting pattern generator 5 raises the level of the LED turn on/off signal S1 from the low level to the high level, the booster circuit output voltage S2C reaches the voltage value Th3.

Subsequently, at a time T22, when the booster circuit output voltage S2C reaches the voltage threshold Th1 at which the LED 7 is turned on, the level of the LED electric current S3C rises from the low level to the high level, and the LED 7 is turned on. Then, the LED electric current is fed back to the booster circuit 2 via the terminal A2.

Thereafter, operations identical to those described above are repeatedly carried out at a time T6, a time T7, a time T23, and a time T9.

First, the following description discusses, with reference to (b) of FIG. 6, an operation which is carried out in a case where the LED turn on time is long. At the time T1, when the light emitting pattern generator 5 raises a level of an LED turn on/off signal S4 from a low level indicative of turning off of the LED to a high level indicative of turning on of the LED, the transistor 6 is turned on, and the switching switch 3 is switched to the terminal A2 corresponding to the LED electric current.

The booster circuit output voltage S5C starts increasing from the predetermined voltage value Th3. Then, at the time T21, when the booster circuit output voltage S5C reaches the voltage threshold Th1 at which the LED 7 is turned on, a level of an LED electric current S6C rises from a low level to a high level, and the LED 7 is turned on. Then, the LED electric current is fed back to the booster circuit 2 via the terminal A2.

Thereafter, at a time T10, when the light emitting pattern generator 5 lowers the level of the LED turn on/off signal S4 from the high level to the low level, the transistor 6 is turned off, the level of the LED electric current S6C falls from the high level to the low level, and the LED 7 is turned off. The switching switch 3 is switched to the terminal A3. Then, the voltage corresponding to the predetermined voltage value Th3 of the power supply 13 is fed back to the booster circuit 2 via the terminal A3. The booster circuit output voltage S5C starts decreasing.

Then, at a time T24, the booster circuit output voltage S5C reaches the voltage value Th3 and stops decreasing.

Thereafter, operations identical to those described above are repeatedly carried out at the time T4, the time T22, a time T11, a time T25, the time T7, the time T23, a time T12, and a time T26.

(Effect of Embodiment 3)

As described earlier, the output voltages S2C and S5C of the booster circuit during turning off of the LED are set at the predetermined voltage value Th3. This eliminates the need for a circuit for storing booster electric power during turning on of the LED, so that a simpler circuit can be realized. For example, in a case where the voltage threshold Th1 is 200 V, the voltage value Th3 is set at 190 V.

(Example of Application)

The LED drive device described earlier can be suitably used to drive a backlight of a television receiver. Further, the LED drive device can be suitably used for an LED illuminating device.

A television receiver which includes the LED drive device and causes the LED drive device to drive a backlight, and an illuminating device which includes the LED drive device also fall under the category of the invention disclosed herein.

(Conclusion)

In order to attain the object, an LED drive device of Aspect 1 of the present invention is an LED drive device for driving an LED in a switching mode, including: a booster circuit; and a switching section for, (i) during an on period in which an on/off signal specifying turning on/off of a switching element specifies turning on of the switching element, feeding back, to the booster circuit, an electric current flowing to the LED, and (ii) during an off period in which the on/off signal specifies turning off of the switching element, feeding back, to the booster circuit, a voltage signal obtained by dividing an output voltage of the booster circuit.

According to the feature, during the off period in which the on/off signal specifies turning off of the switching element, the voltage signal obtained by dividing the output voltage of the booster circuit is fed back to the booster circuit. This prevents a decrease in output voltage of the booster circuit during the off period in a case where an LED turn on time is short. Accordingly, a decrease in booster circuit output voltage can be prevented even if the LED turn on time is short. This makes it possible to provide an LED drive circuit which is capable of turning on an LED even if an LED turn on time is short, the LED turn on time being an on period of an on/off signal for turning on/off the LED.

The LED drive device of Aspect 2 of the present invention is preferably configured to further include: a storage circuit for storing the voltage signal, during the off period, the switching section feeding back, to the booster circuit, the voltage signal that is stored in the storage circuit.

According to the configuration, the output voltage of the booster circuit during the on period is stored, and the stored output voltage can be used as the voltage signal during the off period.

The LED drive device of Aspect 3 of the present invention is preferably configured such that in order to offset an increase in output voltage of the booster circuit during the off period, a voltage of the voltage signal is set to be lower than a voltage corresponding to the output voltage of the booster circuit during the on period.

According to the configuration, the voltage of the voltage signal is set to be lower than the voltage corresponding to the output voltage of the booster circuit during the on period, so that the increase in output voltage of the booster circuit during the off period is offset. As a result, even in a case where a noise, a variation in component, and/or the like cause(s) a booster circuit to have a higher output voltage during the off period than during the on period, an electric current whose value is larger than a set value can be prevented from flowing to an LED at the start of the on period.

The LED drive device of Aspect 4 of the present invention is preferably configured such that in order to offset an increase in output voltage of the booster circuit during the off period, a voltage of the voltage signal is set at a predetermined voltage.

The configuration makes it only necessary to set the voltage of the voltage signal at the predetermined voltage. This eliminates the need for a circuit for storing the output voltage of the booster circuit during the on period, so that a simpler circuit can be realized.

The LED drive device of Aspect 5 of the present invention is preferably configured to further include a light emitting pattern generator for generating the on/off signal.

The configuration makes it possible to use the on/off signal that is generated by the light emitting pattern generator. This eliminates the need for external input of the on/off signal.

Note that a television receiver including an LED drive device mentioned above, the television receiver causing the LED drive device to drive a backlight also falls under the category of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is usable for an LED drive device which includes a booster circuit and drives an LED in a switching mode in accordance with an on/off signal specifying turning on/off of a switching element.

Further, the present invention is also usable for an LED drive circuit of a backlight of a liquid crystal television and a drive circuit of an LED illumination.

REFERENCE SIGNS LIST

1 LED drive device
2 Booster circuit

3 Switching switch (switching section)
4 Storage circuit
5 Light emitting pattern generator
6 Transistor (switching element)
7 LED
8A Amplifier
8B Amplifier
9 Switch
11 Power supply

The invention claimed is:

1. An LED drive device for driving an LED in a switching mode, comprising:
   a booster circuit for supplying an electric current to the LED;
   a switching element connected with the downstream side of the LED;
   a first voltage-driving resistance and a second voltage-driving resistance which are provided so as to branch off between the booster circuit and the LED and are serially connected; and
   a switching section for, (i) during an on period in which an on/off signal specifying turning on/off of a switching element specifies turning on of the switching element, feeding back, to the booster circuit via the switching element, an electric current flowing to the LED, and (ii) during an off period in which the on/off signal specifies turning off of the switching element, feeding back, to the booster circuit from between the first voltage-dividing resistance and the second voltage-dividing resistance, a voltage obtained by dividing an output voltage of the booster circuit.

2. The LED drive device as set forth in claim 1, further comprising:
   a storage circuit for storing the voltage,
   during the off period, the switching section feeding back, to the booster circuit, the voltage that is stored in the storage circuit.

3. The LED drive device as set forth in claim 1, wherein voltage is set to be lower than a voltage corresponding to the output voltage of the booster circuit during the on period.

4. The LED drive device as set forth in claim 1, wherein voltage is set at a predetermined voltage.

5. The LED drive device as set forth in claim 1, further comprising a light emitting pattern generator for generating the on/off signal.

6. A television receiver comprising an LED drive device as set forth in claim 1, the television receiver causing the LED drive device to drive a backlight.

* * * * *